United States Patent [19]
Cole et al.

[11] 3,977,489
[45] Aug. 31, 1976

[54] FRAMEWORK FOR A WHEELED SELF-PROPELLED TRUCK

[75] Inventors: Carroll R. Cole; Richard E. Guhl; Lloyd E. Terry, all of Decatur, Ill.

[73] Assignee: Caterpillar Tractor Co., Peoria, Ill.

[22] Filed: Jan. 24, 1975

[21] Appl. No.: 543,760

[52] U.S. Cl. .............................. 180/89 R; 296/28 C; 280/106 R; 280/670
[51] Int. Cl.² ...................... B60P 1/16; B62D 21/02
[58] Field of Search ................. 180/89 R, 64 R; 280/106 R, 106.5, 96.2 R, 150 C, 670; 296/28 C, 28 R, 28 F, 102; 298/17, 22 R; D12/61

[56] References Cited
UNITED STATES PATENTS

| | | | |
|---|---|---|---|
| 2,781,102 | 2/1957 | Prichard | 296/28 C X |
| 2,838,126 | 6/1958 | Gleasman | 180/89 A |
| 2,855,064 | 10/1958 | McCullough | 180/89 R X |
| 2,947,376 | 8/1960 | Norrie | 180/89 A |
| 3,126,975 | 3/1964 | Dafoe | 180/89 A |
| 3,341,220 | 9/1967 | Kress | 280/106.5 R |
| 3,450,223 | 6/1969 | Jones | 180/89 R |
| 3,794,383 | 2/1974 | France et al. | 298/17 R |

Primary Examiner—Kenneth H. Betts
Attorney, Agent, or Firm—Oscar G. Pence

[57] ABSTRACT

A framework is provided for a relatively large off-highway truck which has front wheels supported by independent suspension struts positioned on opposite sides of the engine. The framework includes a pair of longitudinally disposed, laterally spaced main side rails and a superstructure which provides an upper, transverse bridgework interconnecting the side rails to add transverse rigidity in a manner which does not obstruct overhead accessibility to the engine. The superstructure also provides radial support for the upper ends of the struts to minimize twisting of the main side rails by moment loads created by the wheels. The superstructure further supports a roll-over protective structure for the operator cab of the truck in a manner which minimizes the transmission of severe impact loads in the event of rollover to the main frame.

10 Claims, 7 Drawing Figures

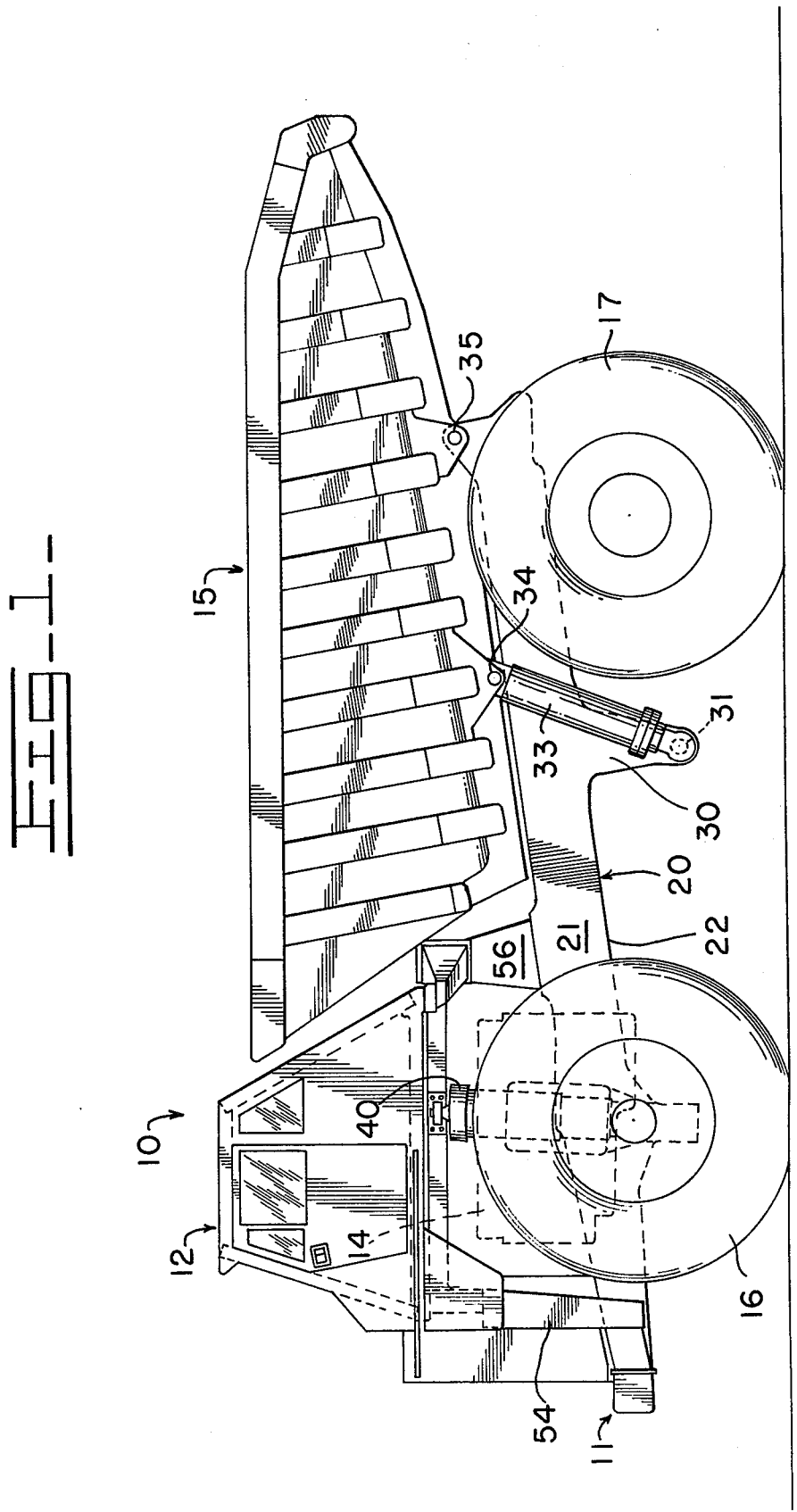

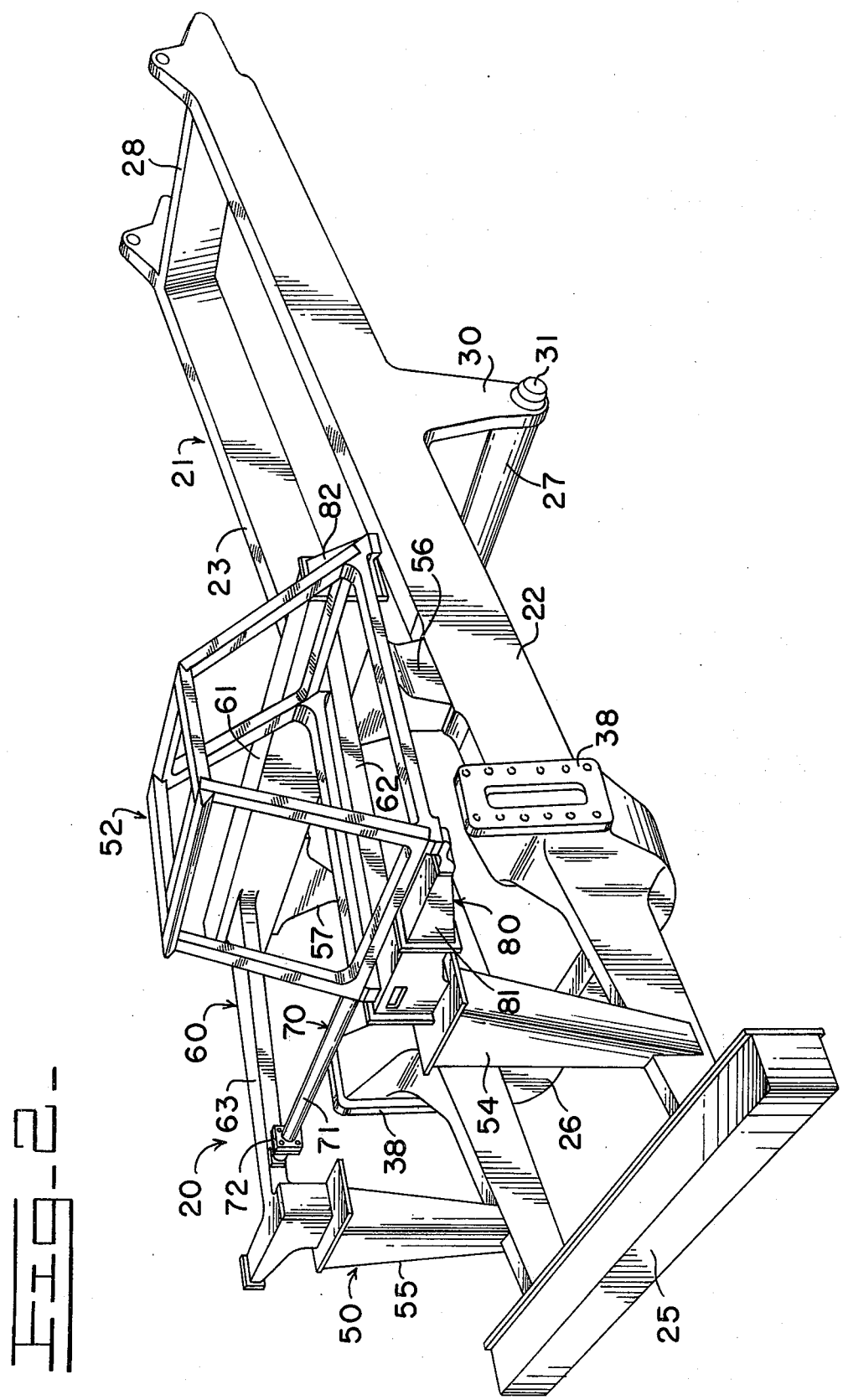
Fig-2-

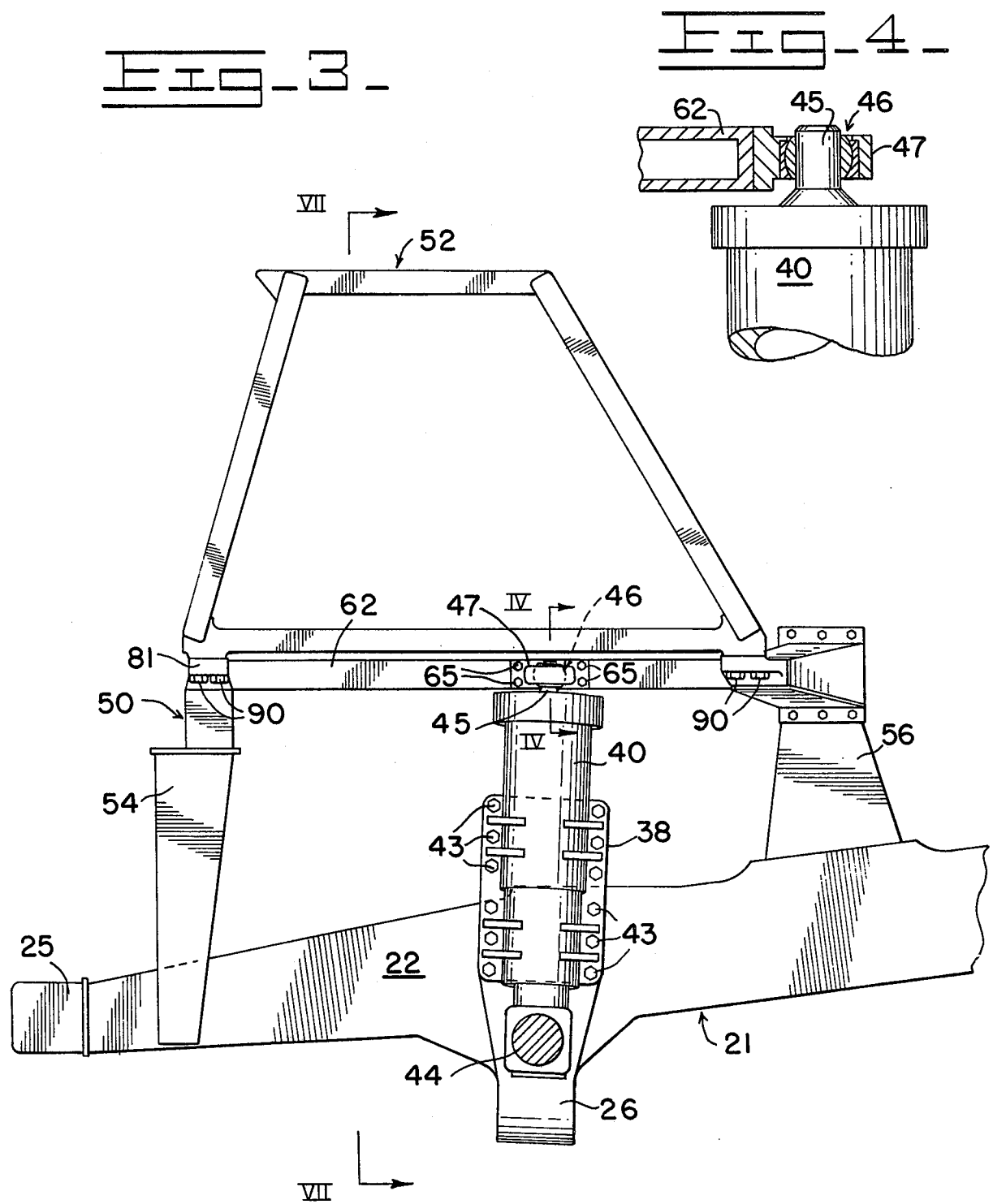

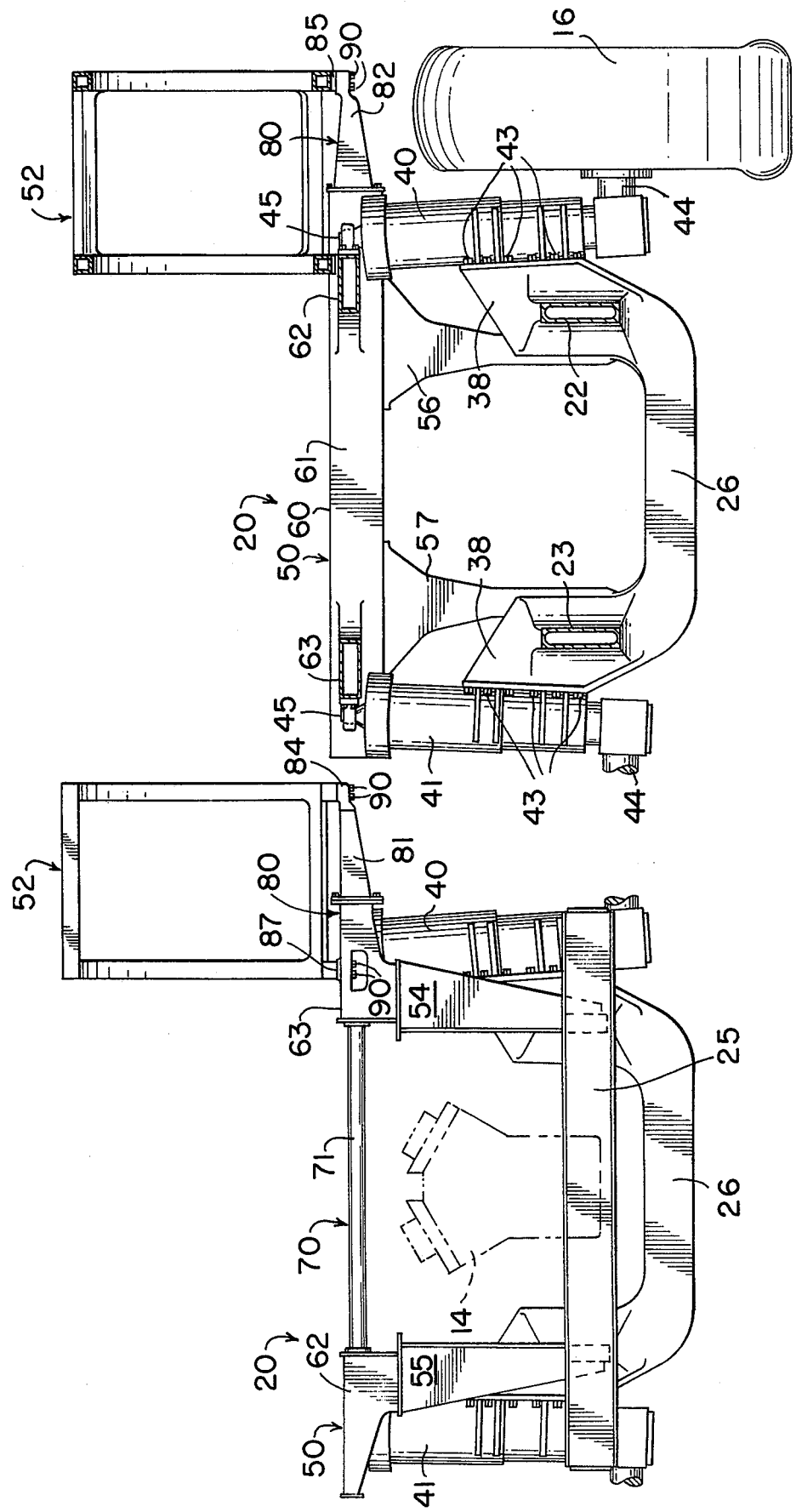

FRAMEWORK FOR A WHEELED SELF-PROPELLED TRUCK

BACKGROUND OF THE INVENTION

This invention relates to a framework for a relatively large off-highway truck of the type having front wheels disposed on opposite sides of the engine and carried in offsetting, cantilevered relation from the opposite sides of the framework by a pair of independent wheel mounting struts. Trucks of the above type are extensively used in the earthmoving industry for hauling heavy loads in excess of 35 tons.

To provide transverse rigidity between the front wheels, prior frameworks have used a circular-shaped cross support, commonly referred to as "the horse collar," which extends in circumposing relationship about the engine. The horse collar carries the large moment forces caused by the cantilevered relation of the wheels to prevent torsional bending of the opposite main side rails of the framework.

However, the presence of such horse collar makes the engine extremely difficult to service and essentially impossible to remove without first removing a portion of the horse collar to permit the necessary access to the engine. As a result, the upper half of the horse collar is normally detachably mounted by bolts. In addition to making the cross support more complex, the bolted connections tend to weaken the structure.

Accessibility to the engine and other various serviceable components related thereto has been further complicated by the recent addition of roll-over protective structures by manufacturers to provide more adequate protection for the operators of such trucks. Prior roll-over protective structures also have been constructed so that they transmit high impact roll-over forces to localized areas of the main frame in a manner which may cause the failure or irreparable damage to the main frame.

OBJECTS OF THE INVENTION

Accordingly, it is an object of this invention to provide a framework for a wheeled, self-propelled truck exhibiting a high degree of structural integrity with sufficient rigidity to withstand normal operating loads without obstructing overhead access to the truck's engine to facilitate the engine's serviceability and replacement.

Another object of this invention is to provide a framework which is adapted to support a roll-over protective structure for the operator's station on the truck and is capable of accepting severe impact loads imparted thereon through such roll-over protective structure in the event of roll-over without causing failure or irreparable damage to the main frame members of the framework through the uniform distribution of loads thereto and the strategic controlled energy absorbing deflection of certain members of the framework.

Another object of this invention is to provide a framework which is adapted radially to support the uppermost ends of the front wheel mounting struts so to prevent twisting of the main frame side rails by the struts during normal operation, and to utilize the struts as load distributing members by transmitting some of the roll-over loads therethrough to the side rails to use all of the components of the framework to the greatest advantage.

Other objects and advantages of the present invention will become more readily apparent upon reference to the accompanying drawings and following description.

BRIEF DESCRIPTION OF THE DRAWING

FIG. 1 is an over-all left side elevational view of a wheeled, self-propelled truck having a framework embodying the principles of the present invention.

FIG. 2 is an over-all isometric view of the framework of FIG. 1 and illustrating a roll-over protective structure for the truck's operator cab mounted thereon.

FIG. 3 is an enlarged left side elevational view of the front portion of the framework and the roll-over protective structure.

FIG. 4 is a further enlarged fragmentary sectional view taken along the line IV—IV of FIG. 3.

FIG. 5 is a top plan view of FIG. 3.

FIG. 7 is a transverse sectional view of the framework taken along the line VII—VII of FIG. 3.

DETAILED DESCRIPTION OF THE PREFERRED EMBODIMENT

Figure 6:
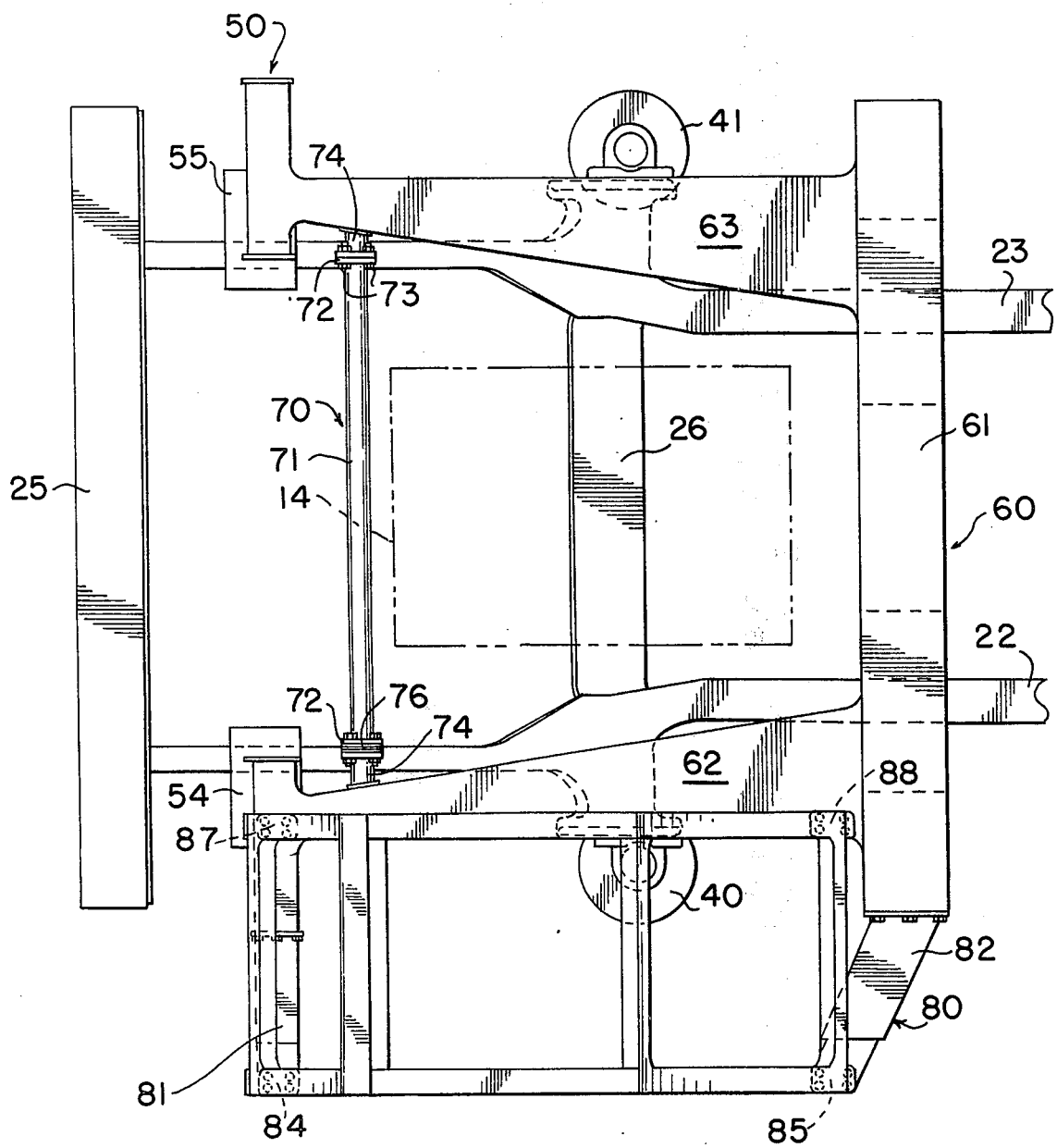
FIG. 6 is a front elevational view of the framework as viewed from the left hand side of FIG. 3.

Referring more particularly to the drawings, a relatively large, off-highway truck capable of hauling loads in excess of 35 tons is generally indicated at 10 in FIG. 1. The truck includes a chassis 11 having an operator cab 12 and engine 14 carried at its forward end and dump body 15 carried at its rearward end. The chassis is supported for movement along the ground by front and rear ground engaging wheels 16 and 17, respectively. The rear wheels 17 are drivingly coupled to the engine through a conventional drive train, not shown. The chassis also includes a framework 20 to which this invention principally relates.

As best shown in FIG. 2, the framework 20 includes a main frame 21 having a pair of elongated, laterally spaced, longitudinally disposed main side rails 22 and 23. The distance between the side rails define the lateral extremities of a cavity for the engine 14. Each side rail is provided with a relatively large height dimension so as to support extremely large vertical loads without bending.

The main frame 21 also includes a plurality of cross members 25, 26, 27, and 28 which are interconnected between the main side rails 22 and 23 for tying the side rails together to prevent relative movement therebetween and provide the necessary transverse rigidity to keep the side rails in proper alignment with each other. The first cross member 25 is disposed across the front ends of the side rails and also serves as the front bumper for the truck. The second cross member 26 is disposed under the cab portion of the truck in spaced relation behind the first cross member. Cross member 26 is generally U-shaped to clear the engine 14 which is mounted directly overhead. Such cross member also defines the lower extremity of the engine cavity. The third cross member 27 is located under the dump body portion of the truck and is connected between a pair of legs, one of which is shown at 30, which project downwardly from each of the main side rails. Each of the legs is provided with a trunnion 31 for pivotally mounting the lower ends of the pair of dump body hoisting jacks, one of which is shown at 33 in FIG. 1. The upper ends of the jacks are pivotally connected at 34 to the dump body for pivotally moving the body relative to the main frame about a pivot connection at 35 adjacent the rearward ends of the side rails. The fourth cross member 28 extends between the side rails adjacent their rearward ends.

Returning to the operator cab portion of the frame in FIG. 2, the second or U-shaped cross member 26 is provided with a pair of outwardly, transversely facing mounting flanges 38. The mounting flanges are utilized for supporting a pair of generally vertically disposed left and righthand independent suspension cylinders or struts 40 and 41 as shown in FIGS. 6 and 7. The struts are secured to their respective mounting flanges 38 by a plurality of mounting bolts 43 shown in FIG. 3.

A generally horizontally disposed wheel spindle 44 is provided at the lower ends of such struts for individually rotatably mounting the front wheels 16 in cantilevered relation to their respective main side rails 22 and 23. Each strut is also provided with a mounting post 45 extending coaxially from its upper end. As best shown in FIG. 4, each post is mounted within a spherical bearing 46 which is carried by a bracket 47.

Referring again to FIG. 2, the framework 20 further includes a superstructure 50 for transversely interconnecting the main frame 21 at a raised elevated position above the main side rails 22 and 23 and for supporting a roll-over protective structure 52 that serves as a framework for the operator cab 11. Such superstructure includes a pair of front pylons 54 and 55 which are individually connected to and extend upwardly from the left and righthand main side rails 22 and 23, respectively. A pair of rear pylons 56 and 57 are likewise connected to and extend upwardly from their respective side rails. The front plyons 54, 55 are disposed ahead of the U-shaped cross support 26 at the front of the engine 14. The rear pylons 56, 57, in turn, are disposed behind the cross support 26 at the rear of the engine and, in conjunction with the front pylons, define the longitudinal extremities of the engine cavity.

The superstructure also includes a generally U-shaped, horizontally disposed cross support structure 60 which is mounted atop the upper ends of the pylons at an elevated position above the engine so as to define the upper extremity of its cavity. In particular, the cross support structure has a base portion 61 extending transversely between the rear pylons 56 and 57 and a pair of laterally spaced leg portions 62 and 63 which extend forwardly from the rear pylons to their respective front pylons 54 and 55. As the pylons are located at the four corners of the engine cavity with the cross support structure 60 being disposed in bordering relation about the top of the engine cavity, unobstructed access is available to the engine from above so to facilitate its removal and enhance its serviceability without the removal of any of the framework. This allows all of the above described components of the superstructure to be assembled in a permanent manner, such as by welding, to enchance its structural integrity and load carry capabilities.

As best shown in FIG. 3 the earlier described brackets 47 are individually secured to their corresponding leg portions 62 and 63 of the cross support structure 60 by bolts 65. As a result, the spherical bearings 46 carried by the brackets provide radial support to the struts 40 and 41 so that moment forces created by the cantilevered relationship of the wheels 16 are carried by the leg portions 62 and 63. The leg portions are adapted to transmit such loads to the base portion 61 of the cross support structure 60. The vertical transverse rigidity cooperatively afforded by the superstructure and the lower U-shaped cross member 26 is therefor effective in preventing the transmission any moment loads from the struts to the side rails 22 and 23 to prevent undue twisting of such side rails.

As best shown in FIG. 5, the superstructure also includes a front cross support member 70 which is detachably mounted between the leg portions 62 and 63 of the cross structure adjacent the front pylons 54 and 55. Such front cross support member includes a length of pipe 71 having a pair of rectangular plates 72 secured at its opposite ends to provide mounting flanges through which a plurality of bolts 73 are received. The bolts are screwthreadably secured into a pair of mating flanged brackets 74 provided on each of the leg portions. An appropriate number of shims, as shown at 76, may be used to alleviate any variations in manufacturing tolerances to insure a tight fit between the brackets.

A mounting structure 80 is also provided on the superstructure 50 for supporting the roll-over protective structure 52. The mounting structure includes a pair of horizontally disposed, cantilevered arms 81 and 82 which extend laterally in longitudinally spaced relation from the lefthand side of the cross support structure 60. One of a pair of mounting pads 84 and 85 are provided on the distal ends of each arm. Each pad is adapted for abutting engagement against its adjacent corner of the roll-over protective structure 52. Two similar mounting pads 87 and 88 are provided along the lefthand leg portion 62 of the support structure 60 which engage the opposite corners of the protective structure. Each of such corners is secured to its respective pad by a plurality of bolts indicated by reference numeral 90 in FIGS. 3, 6 and 7.

The above described framework is adapted to be sufficiently rigid to carry normal operating loads without any appreciable flexure of its various components which otherwise may be detrimental to their lives. However, such framework is further adapted to accept the high impact loads which occur in the event the truck rolls over due to some mishap without causing failure or irreparable damage to the main frame 21.

In this regard it will be appreciated that the most severe or potentially damaging impact loads will occur to the roll-over protective structure 52 due to its elevated position above and its rigid attachment to the framework. The particular construction of the framework firstly protects the main frame from such severe impact loads through the utilization of the cantilevered arms 81 and 82 of the mounting structure 80 which support the roll-over protective structure. Such arms are adapted to absorb energy upon impact by their yielding through bending. Further protection is provided by the superstructure through the arrangement of its various components in generally rectangular configurations relative to each other and to their corresponding components of the main frame. This allows the components of the superstructure to deflect, if need be, to absorb impact energy transmitted thereto through the mounting structure.

The cross support structure 60 and the front cross support member 70 cooperate to insure that the loads are evenly distributed between the opposite left and right sides of the superstructure. Such loads are then evenly distributed at widely spaced positions to the opposite side rails through the pylons 54, 55, 56 and 57. When the impact is severe enough to cause the lateral deflection of the leg portions 61 and 62 of the cross support structure 60, the loads are also transmitted into the side rails by the struts 40 and 41 through their spherical bearings 66. Consequently, any possible damage to the main frame 21 is greatly minimized through the absorbtion of impact energy by the superstructure and by the uniform, widely dispersed distribution of the loads to the side rails 22 and 23 by the pylons and the struts.

It will be further appreciated that all of this is accomplished without any overhead obstruction to the engine 14 which greatly enhances its serviceability and/or removal when desired.

While the invention has been described and shown with particular reference to the preferred embodiment, it will be appreciated that variations might be possible that would fall within the scope of the present invention, which is not intended to be limited except as defined in the following claims.

What is claimed:

1. A framework, for a wheeled, self-propelled truck of the type having a pair of front wheel mounting struts and an operator roll-over protective structure, comprising:
   a pair of longitudinally disposed, load bearing main side rails laterally spaced to define an engine cavity therebetween;
   a U-shaped cross member having opposite ends and extending in transverse, interconnecting relation between said side rails at a level therebelow and defining the bottom of said engine cavity;
   means for individually mounting said pair of wheel mounting struts in cantilevered, laterally disposed relation to said main side rail at the opposite ends of said cross member;
   a superstructure interconnecting said main side rails at a raised elevated position thereabove and including a generally U-shaped, horizontally disposed cross support structure defining the top of said engine cavity, and disposed in bordering relation thereabout so that said cavity is opened vertically to permit unobstructed access thereto from above; and
   a mounting structure carried by said superstructure in laterally offsetting relation to said engine cavity for supporting the operator cab roll-over protective structure.

2. The framework of claim 1 wherein said superstructure includes;
   a pair of front pylons individually connected to and extending upwardly from said pair of main side rails;
   a pair of rear pylons individually connected to and extending upwardly from said main side rails in spaced longitudinal relation behind said front pylons and defining therewith the longitudinal extremities of said engine cavity.

3. The framework of claim 2 wherein said U-shaped cross support structure is connected atop said pylons and includes a transversely disposed base portion extending between said pair of rear pylons and a pair of longitudinally disposed leg portions individually extending between the front and rear pylons on each of said side rails.

4. The framework of claim 3 wherein said leg portions have forward ends and said superstructure includes a transversely disposed, front cross member which is detachably connected between said leg portions adjacent the forward ends.

5. The framework of claim 1 wherein said mounting structure includes a pair of horizontally disposed, cantilevered arms extending in laterally disposed, longitudinally spaced relation from one of said leg portions of said cross support structure in underlying supporting engagement with said roll-over protective structure.

6. A framework, for a wheeled self-propelled truck, having a main frame including a pair of longitudinally disposed main side rails spaced laterally apart to define an engine cavity therebetween and a U-shaped cross support member extending in transverse interconnecting relation between the side rails at a level therebelow and defining the bottom of the engine cavity, the improvement comprising;
   front and rear pairs of pylons connected to and extending upwardly from said main side rails at opposite forward and rearward ends, respectively, of said engine cavity;
   a generally U-shaped, horizontally disposed cross support structure connected atop the upper ends of said pylons in spaced elevational relation above said side rails and including a transversely disposed base portion extending between said pair of rear pylons and a pair of longitudinally disposed leg portions extending between the corresponding ones of said front and rear pylons on each of said side rails for providing transverse and longitudinal rigidity to the framework in a manner bordering the engine cavity so as to permit unobstructed access thereto from above; and
   a front, transversely disposed cross member detachably mounted between the leg portions of said U-shaped cross support member adjacent the front pylons to provide additional transverse rigidity to said framework.

7. A framework, for a wheeled self-propelled truck, having a main frame including a pair of longitudinally disposed, laterally spaced main side rails and an operator cab roll-over protective structure disposed in space elevational relation above and in lateral offsetting relation to one side of said main frame, the improvement comprising:
   front and rear pairs of pylons connected to and extending upwardly from said side rails at the opposite front and rearward ends of said roll-over protective structure;
   means for laterally interconnecting the upper ends of said pylons for transmitting transverse forces therebetween; and
   a mounting structure including a longitudinally extending leg portion disposed between said front and rear pylons on the side adjacent and roll-over protective structure and a pair of horizontally disposed arms extending in cantilevered relation outwardly from said leg portion in underlying supporting engagement with said roll-over protective structure.

8. A framework, for a wheeled self-propelled truck, having a pair of longitudinally disposed load-bearing main side rails and a lower cross support member, with the side rails being spaced laterally apart to define an engine cavity therebetween and supporting one of a pair of transversely disposed wheels in cantilevered relation thereto on opposite sides of the engine cavity, and the cross support member being interconnected between the side rails between the wheels at a level below the engine cavity, wherein the improvement comprises:
 a superstructure extending between the side rails at a raised elevation thereabove and cooperating with the lower cross support member for providing transverse rigidity to the side rails to prevent torsionally bending thereof due to any moment loads exerted thereon through said wheels, and including;
  front and rear pairs of pylons connected to and extending upwardly from said rails at opposite front and rearward ends of said engine cavity; and
  a generally U-shaped, horizontally disposed cross support structure connected atop said pylons in spaced elevational relation above said side rails at the top of said engine cavity and including a transversely disposed base portion extending between the pair of rear pylons and a pair of longitudinally disposed leg portions extending between the corresponding ones of said front and rear pylons on each of said side rails, said leg and base portions being disposed in bordering relation about the top of said engine cavity so that said cavity is entirely open vertically to permit unobstructed access thereto from above.

9. The framework of claim 8 including a front transversely disposed cross support member detachably connected between the leg portions adjacent the front pylons to provide additional transverse rigidity to the framework.

10. A framework for a wheeled, self-propelled truck of the type having an engine, front wheels and an operator roll-over protective structure wherein the front wheels are disposed in spaced relation on opposite sides of the engine and the roll-over protective structure is disposed substantially above and to one side of the engine and wherein the framework includes a pair of longitudinally disposed main side rails laterally spaced for receiving the engine therebetween and a lower cross member transversely interconnecting the side rails between the wheels at an elevation below the engine, the improvement comprising:
 a pair of independent suspension cylinder wheel mounting struts for individually mounting said front wheels, said struts being connected in a generally upright manner to respective ones of said side rails at the end of said lower cross member and having upper ends disposed above the side rails;
 front and rear pairs of pylons connected to and extending upwardly from said main side rails in spaced relation on opposite sides of said lower cross member at the longitudinal ends of the engine;
 a cross support structure connected atop said pylons including a base portion extending between the pair of rear pylons and a pair of leg portions extending between corresponding ones of said pairs of front and rear pylons on each of said side rails;
 a front cross support member detachably connected between the leg portions of the cross support structure in spaced parallel relation to said base portion adjacent the front pylons, said front cross support member and cross support structure being disposed in bordering relation about the top of the engine so as to define a vertical opening above the engine to permiit unobstructed access thereto from above;
 means for interconnecting the upper ends of the wheel mounting struts to corresponding ones of the leg portions of the cross support structure;
 a pair of spaced, horizontal arms extending laterally from the leg portion of said cross support structure adjacent said roll-over protective structure and in underlying supporting engagement with the protective structure; and
 means for securing said protective structure to said arms and said adjacent leg portion.

\* \* \* \* \*